(12) United States Patent
Wilhelm

(10) Patent No.: US 6,578,913 B2
(45) Date of Patent: Jun. 17, 2003

(54) SEAT AND CLIMBING AID FOR TREE STAND

(76) Inventor: Richard W. Wilhelm, 7410 Beechwood Dr., Harbor Creek, PA (US) 16511

( * ) Notice: Subject to any disclaimer, the term of this patent is extended or adjusted under 35 U.S.C. 154(b) by 0 days.

(21) Appl. No.: 09/916,693

(22) Filed: Jul. 27, 2001

(65) Prior Publication Data

US 2003/0020316 A1 Jan. 30, 2003

(51) Int. Cl.[7] .......................... A47C 31/00; E04G 3/00; A63B 27/00
(52) U.S. Cl. ...................... 297/217.7; 297/16.1; 297/4; 182/187; 182/135; 182/136
(58) Field of Search ................. 297/217.7, 217.1, 297/195.11, 440.1, 16.1, 4; 182/187, 135, 136

(56) References Cited

U.S. PATENT DOCUMENTS

| 4,589,522 A | * | 5/1986 | Shelton ..................... 108/152 |
| 5,101,934 A | * | 4/1992 | Zumbro ..................... 182/135 |
| 5,156,236 A | * | 10/1992 | Gardner et al. ............. 182/135 |
| 5,234,076 A | * | 8/1993 | Louk et al. ................. 182/135 |
| 6,085,868 A | * | 7/2000 | Anthony et al. ............ 108/152 |

* cited by examiner

Primary Examiner—Peter M. Cuomo
Assistant Examiner—Sarah C. Burnham
(74) Attorney, Agent, or Firm—Richard K. Thomson

(57) ABSTRACT

A compact package comprised of a collapsible seat and climbing aid for advantageous use with a tree stand. The climbing aid comprises a generally H-shaped frame with two hand grips projecting orthogonally out of plane of the frame. One rectangular housing is attached to each vertical upright member of the frame and locking screws engage portions of a supporting cable to adjust the size of loop for encircling an element to be climbed. A collapsible seat has an L-shaped frame sized to fit within the vertical uprights of the climbing aid and a securing nut positions a pivotable frame of the collapsible seat in either a first stored position or a second erect position. The securing nut also fastens the climbing aid to the tree stand when the seat is in the stored position.

20 Claims, 6 Drawing Sheets

US 6,578,913 B2

SEAT AND CLIMBING AID FOR TREE STAND

BACKGROUND AND SUMMARY OF THE INVENTION

The present invention is directed to accessories for a tree stand. More particularly, the present invention is directed to a collapsible seat and a climbing aid which interlock and can be utilized on virtually any tree stand.

There has been a great deal of development recently in the design of tree stands for hunters. One area that has yet to be adequately addressed is the provision of a miniature climbing aid. Several climbing aids are available but they are bulky and usually include a harness seat or the like. Further, the harness seat connection to the climbing aid is restricting making it difficult for a bow hunter to position herself/himself for a shot given that the target will inevitably approach from the least convenient direction.

Another area of concern is the provision of a simple seat that can be affixed to virtually any tree stand, collapsible to a stored position for transport and, yet, providing a suitable place to sit for the hunter who may well need to spend hours on the tree stand to bag his quarry.

The seat and tree climbing aid of the present invention are designed to be used together with virtually any commercially available tree stand. The seat of the present invention comprises an L-shaped bracket securable to a floor portion of a tree stand by bolting a first leg of the L-shaped bracket thereto. A support is pivotally attached at a first end to a second leg of the L-shaped bracket and a seat is pivotally attached to a second end of the support. A first bolt secures the support in a first storage position adjacent the first leg of said L-shaped bracket for transport. A second bolt is used to secure the support in a second upright position adjacent the second leg of the L-shaped bracket.

The L-shaped bracket of the seat has a maximum width that is less than a dimension between the first and second support arms of the climbing aid so that the two may be easily assembled on the tree stand for transport. A hole through the cross bar of the climbing aid receives the first bolt and a securing nut is threaded on behind the climbing aid to hold it in place.

The climbing aid is an H-shaped frame having a first vertical member, a second parallel vertical member and an orthogonal horizontal member interconnecting said first and second member; two hand grips extending out of the plane of the H-shaped frame. A first cable-securing means is affixed to the first vertical member. A second cable-securing means is affixed to the second vertical member; in use, a steel cable forms a loop extending between said first and second cable-securing means, the loop loosely encircling an element to be climbed. Adjustable clamping means is associated with at least one of the cable-securing means to permit the steel cable loop to be fixed in a desired adjusted position to accommodate a particular diameter of element to be climbed; whereby the steel cable may be loosely looped around the element to be climbed and locked by the adjustable clamping means, the climbing aid i) being manually positioned at a higher level by a user grasping the two hand grips reaching the climbing aid upwardly to get the steel cable to bite the element to be climbed, ii) the user pulling herself/himself up, iii) obtaining a foot hold at this elevated position and repeating steps i)–iii) to climb the element to be climbed.

Various other features, advantages and characteristics of the present invention will become apparent after a reading of the following specification.

BRIEF DESCRIPTION OF THE DRAWINGS

The preferred embodiment(s) of the present invention are set forth in the drawings, like items bearing like reference numerals and in which.

DETAILED DESCRIPTION OF THE PREFERRED EMBODIMENT(S)

Figure 1:
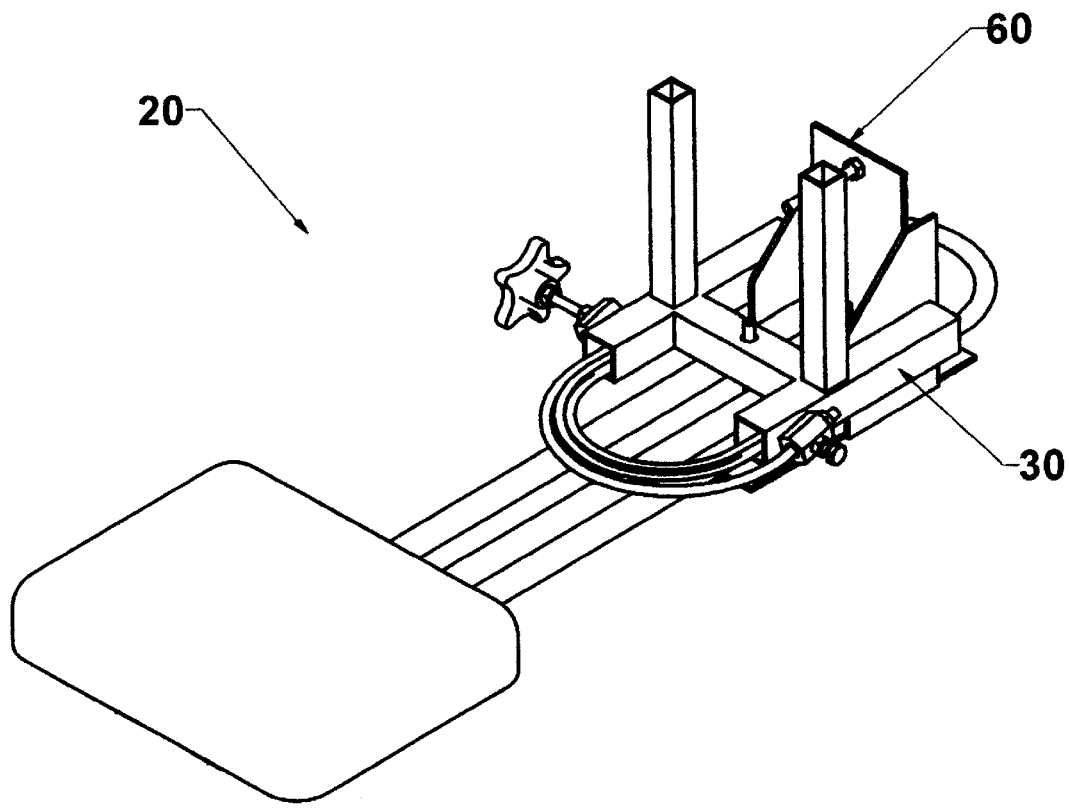
FIG. 1 is a perspective view of a first embodiment of the seat and climbing aid shown in an assembled position.
Figure 2:
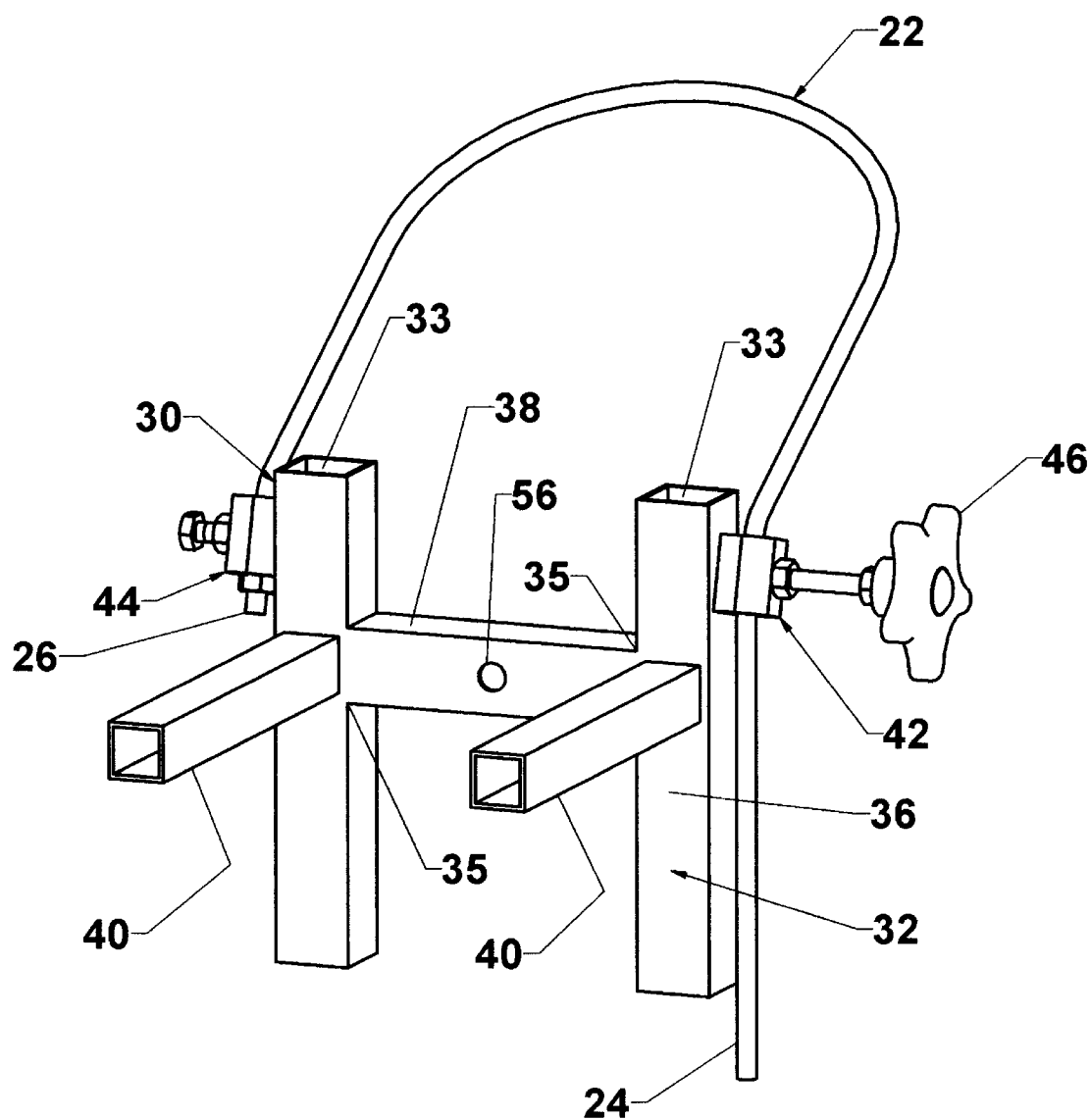
FIG. 2 is perspective view of the first embodiment of the climbing aid shown in an upright position.
Figure 3:
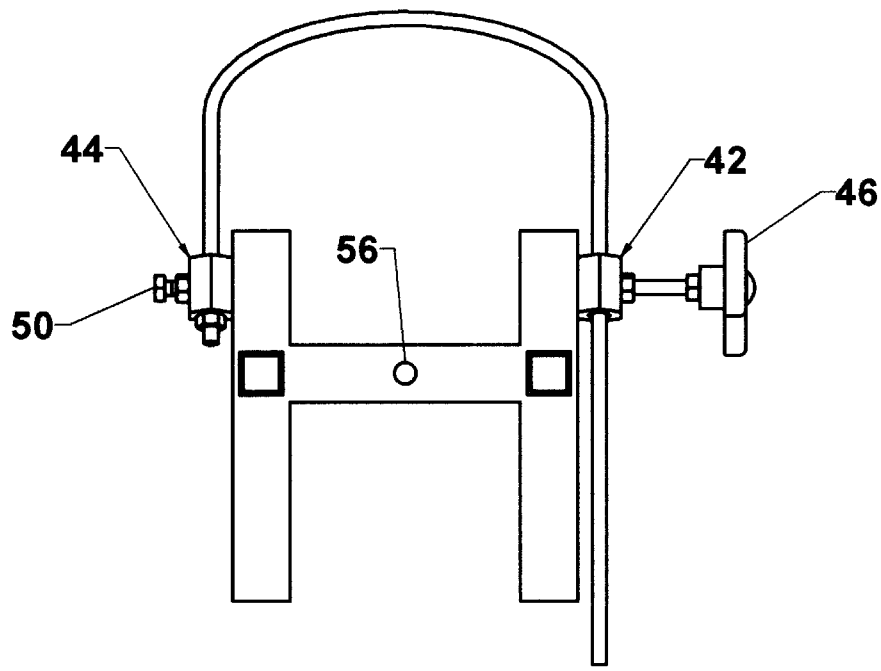
FIG. 3 is a front view of the climbing aid shown in FIG. 2.
Figure 4A:
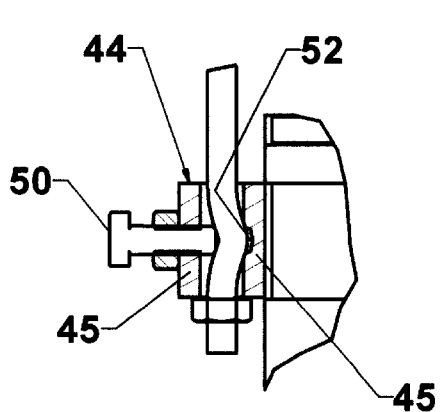
FIG. 4A is a top view of an adjustable clamping means for a first end of a cable with the top removed.
Figure 4B:
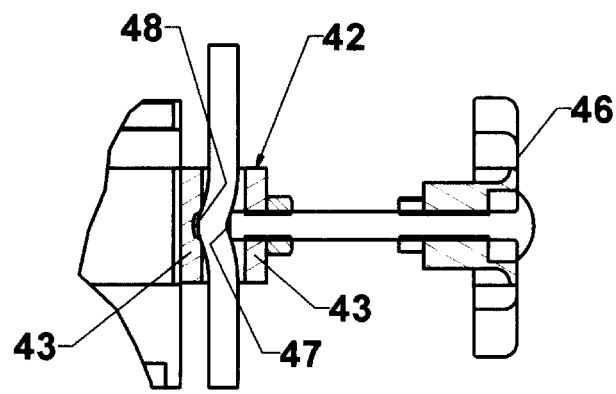
FIG. 4B is a top view of an adjustable clamping means for the second cable end with the top removed.

A first embodiment of the seat and climbing aid for use with a tree stand of the present invention is shown in FIG. 1 generally at 20. There are two principal components: a tree climbing aid 30 and a collapsible seat 60. These two components are designed and engineered to fit neatly into a package that can be utilized with virtually any commercially available tree stand.

Tree climbing aid 30, shown in greater detail in FIGS. 2, 3, 4A, and 4B comprises a generally H-shaped frame 32 which has a first vertically extending member 34, a second parallel vertically extending member 36, and an orthogonally positioned intermediate horizontal member 38 that interconnects first (34) and second (36) vertical members. The horizontal member 38 preferably is welded to members 32 and 34 at points 35 spaced from the top ends 33 thereof to increase stability. Two hand grips 40 project orthogonally out from the H-shaped frame 32 preferably from vertical members 34 and 36 adjacent the attachment points 35 of horizontal member 38 for optimum strength.

First cable securing means in the form of a rectangular housing 42 receives a first portion 24 of cable 22. Second cable-securing means in the form of rectangular housing 44 receives a second portion 26 of cable 22. An adjustable clamping means takes the form of an locking screw 46 that is threadably engaged in wall 43 of rectangular housing 42. The distal end 47 of locking screw 46 forces a portion of first cable portion 24 into recess 48 in opposing wall 43'. This slight diversion of first cable portion 24 into recess 48 by locking screw 46 creates a holding force that is capable of supporting a load in excess of 350 lbs. A second adjustable clamping means in the form of a second locking screw 50 is threadably engaged in wall 45 with distal end 51 of locking screw 50 diverting second cable portion 26 into recess 52 in opposing wall 45'. The use of a second locking screw 50 is optional since this second cable portion 26 could be anchored by welding, knotting or the like. Only one end of the cable 22 needs to be adjustable to facilitate wrapping of cable 22 around an element to be climbed. As shown in FIG. 1, the balance of cable 22 can be looped around as many times as necessary through hollow upright members 34 and 36 and the first cable portion 24 secured in place by inserting it through housing 42 and tightening locking screw 46 when the climbing aid 30 is stored. A hole 56 is bored through the center of horizontal member 38 for facilitating storage with collapsible seat 60.

Figure 5:
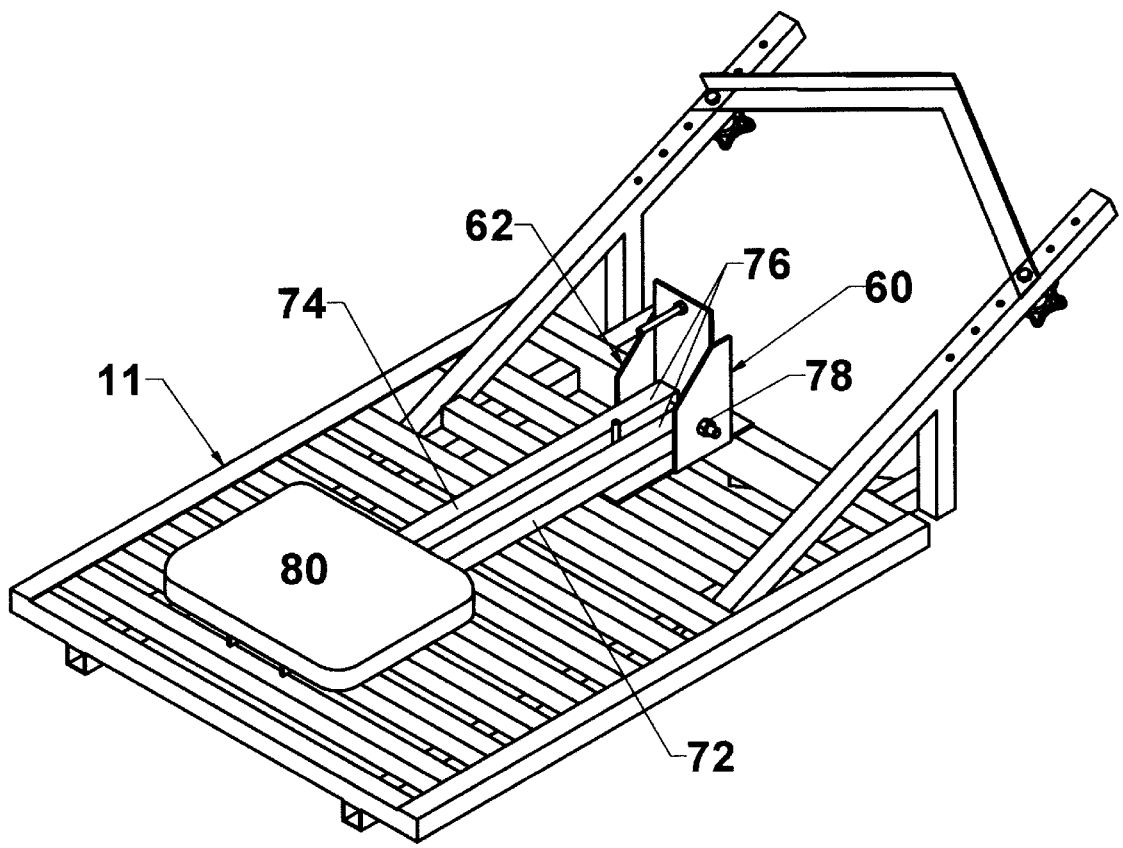
FIG. 5 is a perspective view of the seat of the present invention used with a tree stand.
Figure 6:
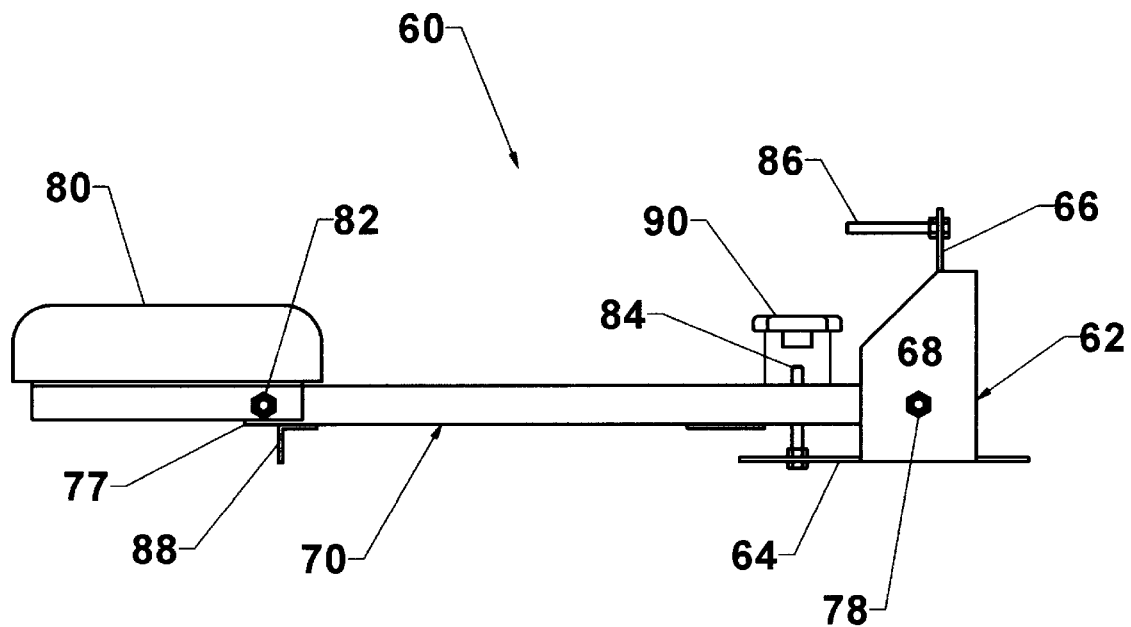
FIG. 6 is a side view of the seat of the present invention shown in a first storage position; and, FIG. 7 is a side view of the seat of the present invention shown in a second erect position.
Figure 7:
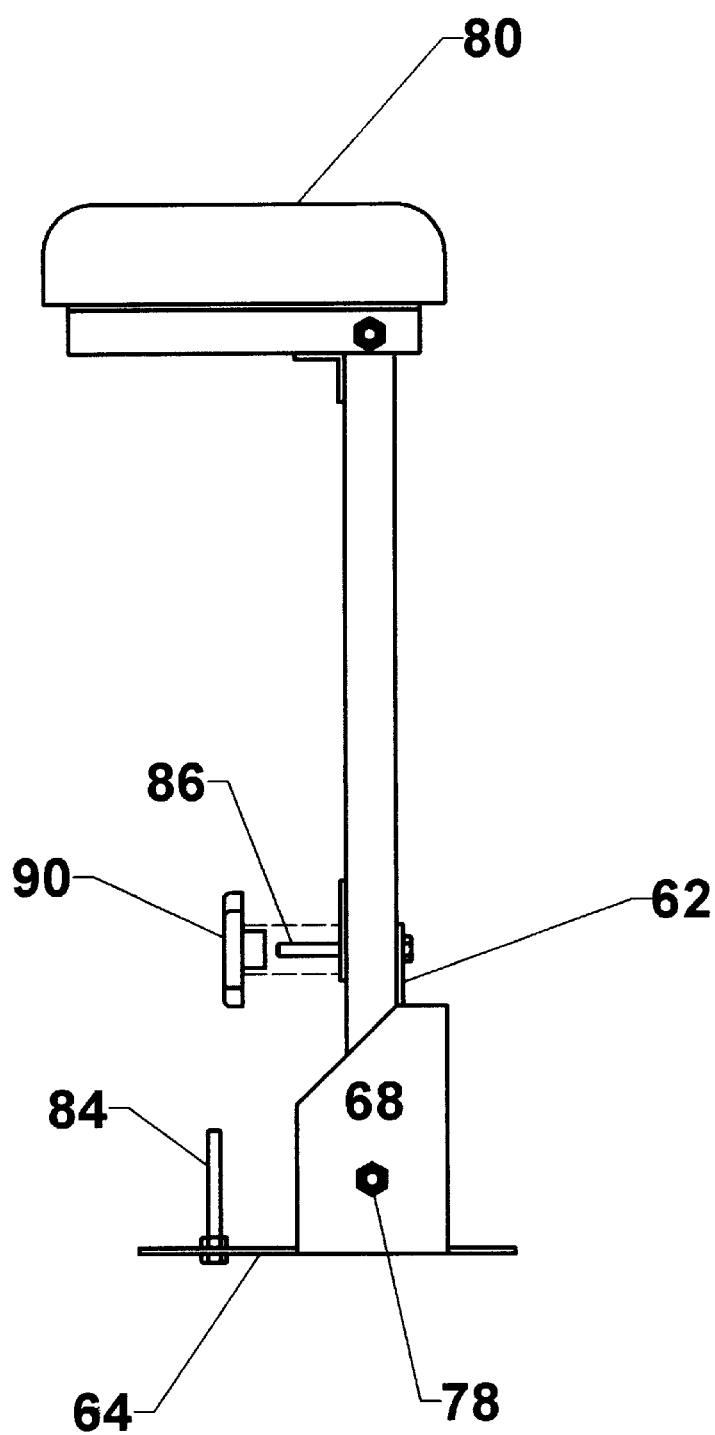

Collapsible seat 60, as best seen in FIGS. 5, 6, and 7, includes a generally L-shaped bracket 62 having a first leg 64 that may be secured to the floor of a tree stand 11. First leg 64 can be spot welded or simply bolted to the tree stand 11, depending principally on whether the seat 60 is part of an originally manufactured unit or is added later to an existing stand. A second leg 66 extends generally orthogonally to first leg 64 and a pair of reinforcing flanges 68 are secured between first (64) and second (66) legs. A support 70 comprised of first support member 72 and second support member 74 is pivotally attached near its first end 76 to L-shaped bracket 62 by pin 78.

Seat 80 is pivotally attached near the second end 77 of support 70 by pin 82. A first bolt means 84 is secured to first leg 64 as by welding and extends orthogonally relative to the surface thereof. Second bolt means 86 is similarly attached to second leg 66 and likewise extends orthogonally relative to that surface. When collapsible seat 60 is in its stored position (FIG. 5), seat 80 extends horizontally in the same direction as first (72) and second (74) support members. An angle iron 88 is secured between first and second support members 72 and 74, respectively, by spot welding (or alternatively, by bolting). When support 70 is extended into its vertical position for use, seat 80 pivots about pin 82 to sit on one flange of angle iron 88. Securing nut 90 is used to fix seat 80 in either its upright or stored position by bearing against support members 72 and 74 as nut 90 threadingly engages either bolt means 86 or 84.

The width of L-shaped bracket 62 is just slightly less than the spacing between vertically extending members 34 and 36 of climbing aid 30 to facilitate assemblage into the storage position (FIG. 1). Hole 56 in horizontal member 38 receives first bolt means 84 so that once securing nut 90 is threaded thereon, collapsible seat 60 and climbing aid 30 are retained in an easily transportable package atop tree stand 11.

In use, the climbing aid 30 is removed from the stored position atop collapsible seat 60, and cable 22 is fastened about an element to be climbed such as a tree, telephone pole, or the like. End 24 of cable 22 is passed through housing 42 and locking screw 46 is tightened to secure the cable in the housing 42. The opposite end 26 is already secured by locking screw 50, or other means. Handles 40 are grasped and cable 22 slid up the far side of the element to be climbed. A securing cable on tree stand 11 will similarly be wrapped around the element to be climbed. It will be appreciated that the cable securing mechanism used with the climbing aid 30 could also be advantageously used with tree stand 11. Because climbing aid 30 has two spaced handles 40, the H-shaped frame 32 may be more easily manipulated over protrusions in the surface of the element being climbed as the cable 22 is inched upwardly. Climbing aid 30 is i) manually positioned at a higher level by a user grasping said two hand grips 40 reaching climbing aid 30 upwardly to get the steel cable 22 to bite the element to be climbed. The user, then, ii) pulls herself/himself up, and iii) obtains a foot hold at this elevated position and repeats steps i)–iii) to climb the element to be climbed. When tree stand 11 is used, the step of obtaining a foot hold will include pulling the tree stand up with her/his feet so that its cable similarly takes a new bite of the element to be climbed. Once the desired level has been reached, securing nut 90 can be used to lock the support 70 in its full, upright and locked position, the seat pivoted downwardly, which it will normally do on its own via the natural gravitational pull and, just that easily and quickly, the seat 80 is ready for occupancy. Hole 56 can be used to secure a safety harness (not shown) to the climbing aid 30 so that, should the user lose her/his grip on handles 40, the wrap of cable 22 around the element to be climbed will prevent the user from falling. Alternatively, a smaller diameter bar can be welded between the vertical members 34 and 36 so the safety harness may be wrapped around it during the climb without contacting the tree. This obviously has safety advantages since loss of one's grip of the climbing aid during the ascent will not result in a fall.

Various changes, alternatives and modifications will be apparent to one of ordinary skill in the art following a reading of the foregoing description. For example, were the climbing aid to be used without the collapsible seat or the tree stand, a simple sling harness seat could be fashioned for attachment to the H-shaped frame to support the hunter after she/he had used the climbing aid to scale a tree. It is intended that all such changes, alternatives and modifications as come within the scope of the appended claims be considered part of the present invention.

I claim:

1. A climbing aid for climbing trees and telephone poles, said climbing aid comprising
   a) an H-shaped frame having a first vertical member, a second parallel vertical member and an orthogonal horizontal member interconnecting said first and second member;
   b) two hand grips extending orthogonally out of the plane of said H-shaped frame;
   c) a first cable-securing means affixed to said first vertical member;
   d) a second cable-securing means affixed to said second vertical member;
   e) a steel cable forming a loop extending between said first and second cable-securing means, said loop loosely encircling an element to be climbed;
   f) adjustable clamping means associated with at least one of said cable-securing means to permit said steel cable loop to be fixed in a desired adjusted position to accommodate a particular diameter of an element to be climbed;
   whereby said steel cable may be loosely looped around the element to be climbed and locked by said adjustable clamping means, said climbing aid i) being manually positioned at a higher level by a user grasping said two hand grips reaching said climbing aid upwardly to get said steel cable to bite the element to be climbed, ii) the user pulling herself/himself up, iii) obtaining a foot hold at this elevated position and repeating steps i)–iii) to climb the element to be climbed.

2. The climbing aid of claim 1 wherein said first cable-securing means comprises a first rectangular housing for receiving a first portion of said steel cable there through, said housing having a first wall, second wall, third wall and fourth wall, said third wall opposing said first wall.

3. The climbing aid of claim 2 wherein said adjustable clamping means comprises a first locking screw threadably engaged with said first wall of said first rectangular housing, a recess in said opposing third wall of said first rectangular housing whereby said locking screw may be tightened to displace a length of said first portion of said steel cable into said recess thereby securing said steel cable in said first rectangular housing.

4. The climbing aid of claim 3 wherein said second cable-securing means comprises a second rectangular housing for receiving a second portion of said steel cable there through, said second rectangular housing having a first wall, a second wall, a third wall and a fourth wall, said third wall opposing said first wall.

5. The climbing aid of claim 4 wherein said adjustable clamping means further comprises a second locking screw threadably engaged with said first wall of said second rectangular housing, a recess in said opposing third wall of said second rectangular housing whereby said locking screw may be tightened to displace a length of said second portion of said steel cable into said recess thereby securing said second portion of said steel cable in said second rectangular housing.

6. A collapsible seat for a tree stand said collapsible seat comprising
   a) an L-shaped bracket securable to a floor portion of a tree stand by bolting a first plate leg of said L-shaped bracket thereto, a pair of reinforcing flanges interconnecting said first plate leg to a second plate leg of said L-shaped bracket;
   b) a support pivotally attached at a first end to said reinforcing flanges of said L-shaped bracket;
   c) a seat pivotally attached to a second end of said support;
   d) first bolt means to lock said support in a first storage position adjacent said first plate leg of said L-shaped bracket;
   e) second bolt means to lock said support in a second upright position adjacent said second plate leg of said L-shaped bracket.

7. The collapsible seat of claim 6 wherein said first bolt means comprises a first bolt element projecting from said first plate leg of said L-shaped bracket.

8. The collapsible seat of claim 7 wherein said second bolt means comprises a second bolt element projecting from said second plate leg of said L-shaped bracket.

9. The collapsible seat of claim 8 further comprising a securing nut alternatively engageable with said first and second bolt elements to lock said collapsible seat in said first position and said second position, respectively.

10. The collapsible seat of claim 6 wherein said support comprises a pair of support members each pivotally attached to said second leg of said L-shaped bracket.

11. The collapsible seat of claim 10 further comprising an angle iron shelf secured to said pair of support members such that said seat member may pivot down and rest thereupon when said support is in its second upright position.

12. A collapsible seat and climbing aid for use with a tree stand comprising
   a) an L-shaped bracket securable to a floor portion of a tree stand by bolting a first leg of said L-shaped bracket thereto;
   b) a support pivotally attached at a first end to a second leg of said L-shaped bracket, said second leg having a first maximum width dimension;
   c) a seat pivotally attached to a second end of said support;
   d) first bolt means to secure said support in a first storage position adjacent said first leg of said L-shaped bracket;
   e) second bolt means to secure said support in a second upright position adjacent said second leg of said L-shaped bracket;
   said climbing aid including
   f) an H-shaped frame having a first vertical member, a second parallel vertical member and an orthogonal horizontal member interconnecting said first and second member, said H-shaped member lying in and defining a first plane, said first and second vertical members being space by a second width dimension greater than said first maximum width dimension, said horizontal member having a longitudinal center with a hole there through to receive said first bolt means;

whereby, said climbing aid may be placed atop said collapsible seat when it is in its first storage position and secured thereto by threading a locking bolt onto said first bolt means.

13. The collapsible seat and climbing aid of claim 12 in which said climbing aid further comprises i) two hand grips extending out of said first plane of said H-shaped frame; ii) a first cable-securing means affixed to said first vertical member; iii) a second cable-securing means affixed to said second vertical member; iv) a steel cable forming a loop extending between said first and second cable-securing means, said loop loosely encircling an element to be climbed.

14. The collapsible seat and climbing aid of claim 13 in which said climbing aid further comprises an adjustable clamping means associated with at least one of said cable-securing means to permit said steel cable loop to be fixed in a desired adjusted position to accommodate a particular diameter of element to be climbed.

15. The collapsible seat and climbing aid of claim 14 in which said first cable-securing means of said climbing aid further comprises a first rectangular housing for receiving a first portion of said steel cable there through.

16. The collapsible seat and climbing aid of claim 14 in which said adjustable clamping means further comprises a first locking screw threadably engaged with one wall of said first rectangular housing, a recess in an opposing wall of said first rectangular housing whereby said locking screw may be tightened to displace a length of said first portion of said steel cable into said recess thereby securing said steel cable in said first rectangular housing.

17. The collapsible seat and climbing aid of claim 16 wherein said second cable-securing means comprises a second rectangular housing for receiving a second portion of said steel cable there through.

18. The collapsible seat and climbing aid of claim 17 wherein said adjustable clamping means further comprises a second locking screw threadably engaged with one wall of said second rectangular housing, a recess in an opposing wall of said second rectangular housing whereby said locking screw may be tightened to displace a length of said second portion of said steel cable into said recess thereby securing said second portion of said steel cable in said second rectangular housing.

19. The collapsible seat and climbing aid of claim 12 wherein said support comprises a pair of support members each pivotally attached to said first leg of said L-shaped bracket.

20. The collapsible seat and climbing aid of claim 19 further comprising an angle iron shelf secured to said pair of support members such that said seat member may pivot down and rest thereupon when said support is in its second upright position.

* * * * *